United States Patent [19]

Puryear

[11] Patent Number: 4,830,308
[45] Date of Patent: May 16, 1989

[54] MULTIPLE CAM MAG BRAKE ADJUSTMENT FOR BAIT CAST REEL

[75] Inventor: John W. Puryear, Tulsa, Okla.

[73] Assignee: Brunswick Corporation, Skokie, Ill.

[21] Appl. No.: 634,162

[22] Filed: Jul. 25, 1984

[51] Int. Cl.$^4$ ............................................. A01K 89/02
[52] U.S. Cl. .............................................. 242/84.52 B
[58] Field of Search .................. 242/84.52 B, 84.5 R, 242/84.5 A, 84.5 P, 84.51 R, 84.51 A, 211, 212, 214, 218, 219, 220, 221; 192/93 C; 310/93, 105; 74/56

[56] References Cited

U.S. PATENT DOCUMENTS

| | | | |
|---|---|---|---|
| 984,523 | 2/1911 | Baer | 192/93 A |
| 1,673,382 | 6/1928 | Hofe | 242/84.5 R |
| 2,528,271 | 10/1950 | Gibbs et al. | 242/84.52 B |
| 3,697,012 | 10/1972 | Walker | 242/84.51 R |
| 4,420,987 | 12/1983 | Heinz | 74/56 |
| 4,434,951 | 3/1984 | Nakajima | 242/84.52 B |

FOREIGN PATENT DOCUMENTS

| | | | |
|---|---|---|---|
| 214801 | 5/1958 | Australia | 242/84.52 B |
| 58-73476 | 5/1983 | Japan | 242/84.52 B |
| 58-115964 | 8/1983 | Japan | 242/84.52 B |
| 2092872 | 8/1982 | United Kingdom | 242/84.52 B |

Primary Examiner—John M. Jillions
Attorney, Agent, or Firm—Wood, Dalton, Phillip Mason & Rowe

[57] ABSTRACT

A fishing reel having a housing with side frames spaced apart by a plurality of spacers and connecting rods. A spool shaft is rotatably supported in the side frames and has a spool thereon having an axis common with the axis of the shaft and lying transverse to the planes of the side frames. A drive is provided for rotating the spool about the axis of the shaft, with a clutch apparatus for releasing the drive from the spool. An anti-backlash assembly is included for resisting the rotation of the spool when the spool is disconnected from the drive. The anti-backlash assembly has an actuator with a pair of cams facing in a direction parallel to the axis of the shaft. The cams on the actuator engage a pair of cams on a bracket and mounting plate lying in planes transverse to the axis of the shaft. A plurality of magnets are carried by the mounting plate which create lines of magnet force with the spool for resisting rotation of the spool. The cams on the actuator and the cams on the bracket each have at least two high points, with the two high points of each cam being spaced apart circumferentially by not more than 180° for maintaining the magnets in a common plane parallel to the side face of the spool.

16 Claims, 2 Drawing Sheets

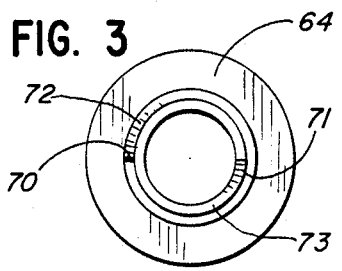
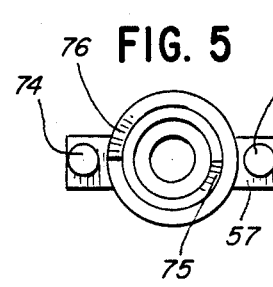
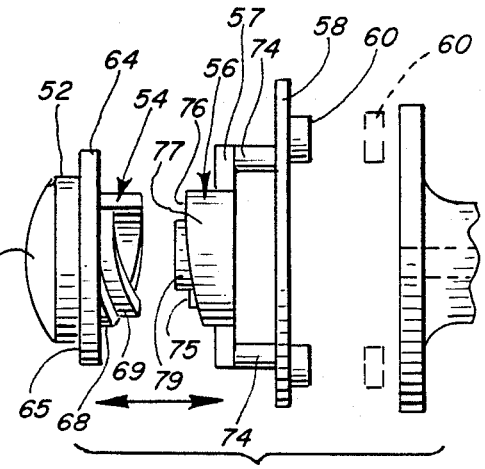
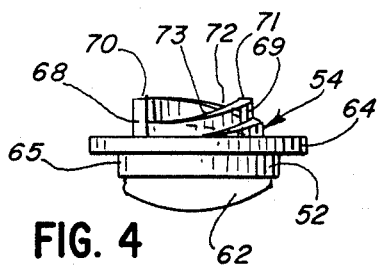
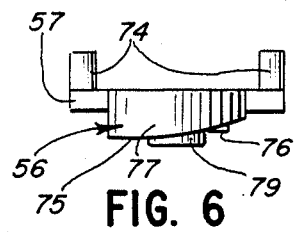
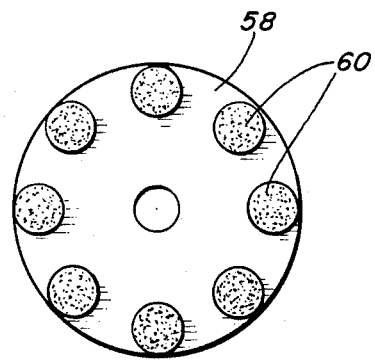
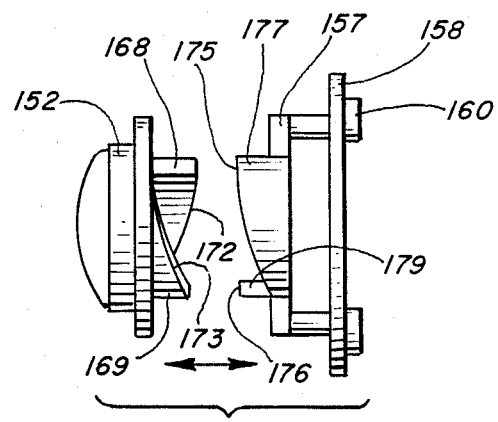
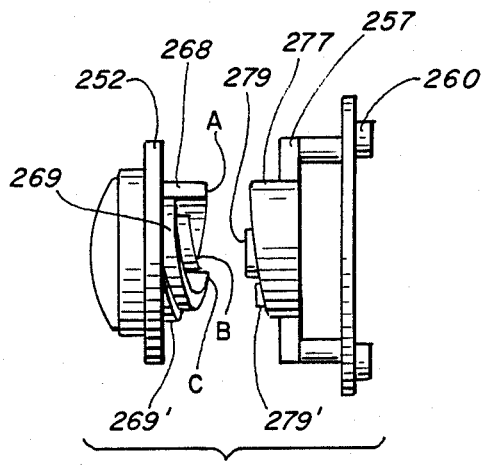
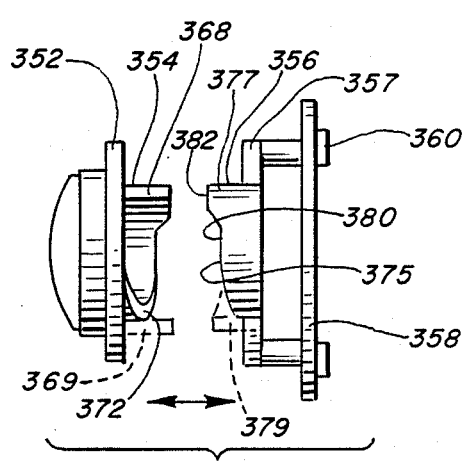

MULTIPLE CAM MAG BRAKE ADJUSTMENT FOR BAIT CAST REEL

FIELD OF THE INVENTION

This invention relates to a fishing reel and, more particularly, to a fishing reel having a backlash control apparatus.

BACKGROUND OF THE INVENTION

In fishing reels and, in particular, bait cast reels, the spool carrying the fishing line is released from restraint so that it is freely rotatably during casting. During certain casts, the spool rotates faster than the line is drawn from the spool, resulting in backlash. The backlash causes the line to become entangled around the spool between the spool and the reel housing as the spool continues to rotate, releasing line even though the line is no longer being payed out from the reel. Centrifugal brakes have been tried to control the backlash, but unfortunately they either do not provide sufficient braking force to eliminate the problem or they overbrake the spool, shortening the cast.

Magnetic brakes have been proposed which have helped solve some of the backlash problem, but some of the structure for operating the magnetic brakes have produced problems that cause canting of the magnets and/or binding of the spool.

THE INVENTION

In the improved fishing reel, matching pairs of cams are provided between the actuator and the mounting plate for the magnets, with each cam having at least two high points spaced apart 180° or less so that the magnets are advanced and retracted in a plane parallel to the plane of the spool flange. With the magnets advanced or retracted in a plane parallel to the spool, even force is applied to the spool for resisting rotation of the spool in a controlled manner.

The matching cam surfaces with the at least two high points provides a degree of control to the magnetic forces acting on the spool such that very fine tuning of the magnetic resistance is possible, making it possible for a fisherman to make a very accurate cast without backlash. By changing the rate of rise of the cam surfaces on the matching cams, different characteristics can be provided. That is, the degree of drag can be changed gradually and continuously and/or then can be changed rapidly, depending on the desires and wishes of the user.

BRIEF DESCRIPTION OF THE DRAWINGS

FIG. 3 is a plan view of a cam on an actuator member;

FIG. 4 is an elevational view of the cam and actuator of FIG. 3;

FIG. 5 is a plan view of a matching cam on a support bracket;

FIG. 6 is an elevational view of the cam and support bracket of FIG. 5;

FIG. 7 is an elevational exploded view of the cam on the actuator aligned but spaced from the matching cam on the support bracket connected to a mounting plate for the magnets;

FIG. 8 is a plan view of the mounting plate with a plurality of magnets in place;

FIG. 9 is an elevational exploded view of a modified form of the cam structure;

FIG. 10 is another elevational exploded modified form of the cam structure;,and

FIG. 11 is still a fourth elevational exploded modified form of the cam structure.

DETAILED DESCRIPTION OF INVENTION

Figure 1:
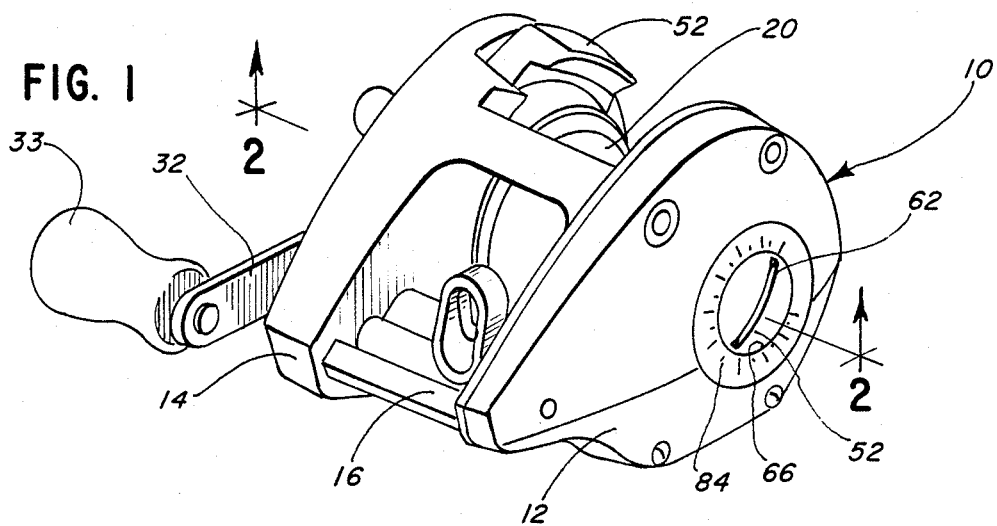
FIG. 1 is a perspective view of a fishing reel incorporating the improved magnetic brake.
Figure 2:
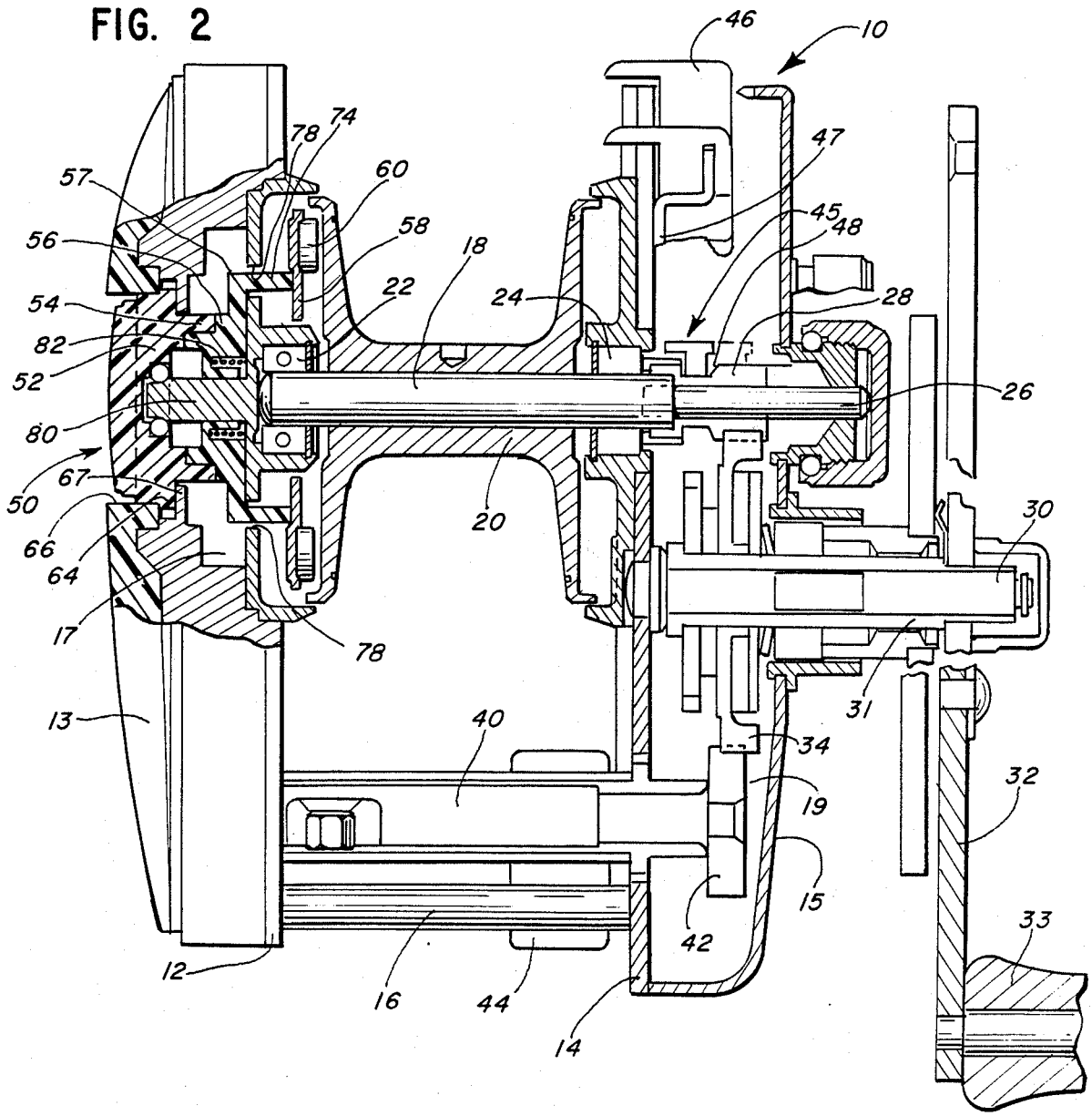
FIG. 2 is a sectional view taken along the plane 2—2 of the reel of FIG. 1 showing the improved magnetic brake.

Referring to FIGS. 1 and 2, a reel housing 10 comprising a pair of first and second side frames 12 and 14 are spaced apart a predetermined amount by spacers and connecting rods 16. Cover plates 13 and 15 are affixed respectively to the side frames 12 and 14 to define cavities 17 and 19 therebetween. A spool shaft 18 mounting a spool 20 is rotatably mounted to the side frames by bearings 22 and 24. The spool shaft 18 has an extension 26 which traverses the space between the side frame 14 and cover 15 and supports a slidable pinion 28 in the cavity 19. A stub shaft 30 is affixed to side frame 14 and projects outwardly from the outside cover 15 for rotatably supporting a sleeve 31 for a crank handle 32 having a knob 33. In the cavity 19 beside the side frame 14, a master gear 34 is keyed on the sleeve 31 for rotation therewith. Rotating the crank handle 32 will rotate the sleeve 31 and master gear 34, which in turn will rotate the pinion 28 meshing with gear 34 to drive the spool 20. A shaft 40 extends between the side frames 12,14 and has a pinion gear 42 extending into the cavity 19 beyond the side frame 14 and meshes with the master gear 34 on the sleeve 31. The shaft 40 supports a level wind guide 44 which traverses between the side frames 12 and 14 to guide the line evenly on the spool 20 during windup of the line.

A clutch mechanism 45 is comprised of an actuating button 46, a yoke 47 which engages with an undercut portion 48 of the pinion 28, so that radial movement of the button 46 will shift the pinion 28 axially of shaft extension 26 to disconnect the drive to the spool shaft 18 so that the spool will free wheel. The clutch mechanism 45 is provided with a kick-out arrangement such that when the crank handle 32 is turned, the clutch will be disengaged so that the pinion 28 will re-engage with the spool shaft 18, whereupon once again rotating the crank handle 32 will wind the line onto the spool 20. The structure hereinabove described is conventional and has been generally in use for many years.

The portion of the fishing reel that has been improved upon is the anti-backlash or magnetic brake arrangement 50 which is mounted in the cavity 17 between the cover 13 and side frame 12 and includes an actuator 52, a first cam 54, a second cam 56, a support bracket 57 and a mounting plate 58 upon which a plurality of magnets 60 are mounted. Turning of the actuator 52 will advance or retract the mounting plate 58 and magnets 60 relative to the spool, thereby decreasing or increasing the magnetic drag on the spool.

More specifically and referring in particular to FIGS. 3-8 as they relate to FIG. 2, the actuator 52 has a protruding finger grip 62 on the face thereof in position to be gripped between a pair of fingers so as to rotate the actuator 52 about the axis thereof. The actuator 52 has an axis that is common with the axis of the shaft 18 and has an outwardly extending flange 64 and the axially extending cam 54. A shoulder 65 forward of the flange 64 is adapted to be nested from the inside of the cover plate 13 in an aperture 66 formed in the cover plate 13. The flange 64, as seen in FIG. 2, seats behind the edge around the aperture 66, which flange is trapped by a collar 67 projecting inwardly from the mounting portion affixed between the cover 13 and the side frame 12. The actuator 52 has a pair of cam members 68 and 69 extending axially of the actuator. Each cam member 68 and 69 follows a full 360° spiral, starting at points 180° apart and arriving at two high points 70, 71, which high points are spaced 180° from each other. The cam member 69 is concentrically displaced radially inward from cam member 68. The cam members 68 and 69 have axially facing cam surfaces 72, 73, which surfaces include the high points 70, 71, respectively. The cam surfaces 72, 73 spiral at an even uniform rate of rise from the low point to the high point, with no abrupt changes in the rise of the cam. A second and mating cam 56 having a pair of cam members 77, 79 is mounted on the support bracket 57, which bracket 57 has a pair of axially extending lugs 74 pointing in one direction with the cam surfaces 75, 76 on the cam members 77, 79 axially facing in the opposite direction. The mounting pate 58 is secured to the lugs 74 by means of screws or the like so that the magnets 60 lie in a circle having a center on the axis of the shaft. The mounting plate 58 and magnets 60 lie in common planes parallel to each other and parallel to the end surface of the spool 20. The pair of cam surfaces 75, 76 that are formed on the cam 56 on bracket 57, which cam surfaces 75, 76 are equal and opposite to the cam surfaces 72, 73 on the actuator 52, mesh therewith in concentric circles.

As can be seen in FIG. 2, the lugs 74 on the bracket 57 pass through guide holes 78 formed in the side frame 12 to permit the second cam 56 to move in a direction parallel to the axis of the shaft 18 but to restrict the second cam 56 against rotation relative thereto. In this way, as the second cam 56 is moved along the axis of the shaft, the magnets 60 are moved closer to or farther from the mating face on the spool 20. As best shown in FIG. 2, as the grip 62 on the actuator 52 is turned, the mating cam surfaces 72, 73 on cam 54 engage with the cam surfaces 75, 76 on the cam 56 to move the mounting plate 58 and magnets 60 along the axis of the shaft 18 toward or away from the spool 20.

The cam 56 on bracket 57 and mounting plate 58 are journalled on a sleeve 80 carried by the frame 12, with the lugs 74 projecting through the apertures 78 in the side frame. A spring 82 is provided between the bracket 57 and the side frame 12 for urging the cam surfaces 75, 76 on the bracket 57 into continual engagement with the cam surfaces 72, 73, on the actuator 62. Turning the actuator 62 will advance or retract the cam surfaces 75, 76 relative to cam surfaces 72, 73, with the spring 82 maintaining the cam surfaces engaged. The advancement or retraction will move the magnets 60 closer to or farther from the end face of the spool 20 to increase or decrease the magnetic drag on the spool.

The length of the cam surfaces 72, 73, 75, 76 are substantially equal to a full circle so that using this form of cam will permit about 350° turning of the actuator 52 providing a finer increment of adjustment between each segment that the actuator is turned.

As seen in FIG. 8, a total of eight magnetic disks 60 are equally spaced around the outer periphery of the mounting plate and in practice, every other magnet will be polarized differently, (i.e. North Pole, South Pole, North Pole) to maximize the drag effect caused by the lines of force of the magnets passing across the air gap to the end of the spool. More or less number of magnets 60 may be used without departing from the spirit of the invention.

FIG. 9 shows a modification of the invention wherein the two cams 168, 169, with cam surfaces 172, 173 are formed on the actuator 152 and two cams 177, 179 having cam surfaces 175, 176 are formed on the bracket 157, with the rise from zero to maximum extending over a 180° arc of the cam circle, thereby creating a pair of high points 180° apart. Each cam extends over an arc of 180° instead of the 360° arc of FIGS. 2–8. With the cam surfaces 172, 173, 175, 176 in contact with each other, a 180° turn of the actuator will produce a maximum rise or maximum axial movement of the mounting plate 158 and magnets 160 relative to the spool. In some circumstances, a maximum turn on the actuator of 180° may be preferred.

FIG. 10 shows three concentric cams 268, 269, 269' having cam surfaces on the actuator 252 and three concentric cams 277, 279, 279' having cam surfaces on the bracket 257, with each cam surface starting at zero and rising to a maximum in an approximately 360° circle, but with each of the three cam surfaces initiating its rise at a point 120° from the initiating point of the rise of the next adjacent cam surface. The result is there will be three high points, each high point being 120° from the adjacent high point. It will be noted that each cam is concentrically spaced inward from the adjacent cam so as to permit each cam surface to have its own independent axial cylinder of influence. The cam surfaces on the actuator 252 coincide with the cam surfaces on the bracket 257 and somewhat guide each other by means of the inner two cams bearing radially against the outermost wall forming the outermost cam. The actuator 252 is journalled in the housing on the sleeve on the housing, with the bracket 257 being held against rotation but being free to move axially by passing the lugs on the bracket through apertures in the wall of the side frame.

FIG. 11 shows another form of mating cams 354, 356 wherein only a single cam member 368 having cam surface 372 is shown on the actuator 352 and a single cam member 377 having cam surface 375 is shown on the bracket 357. Two or more concentric cams are contemplated, one being shown in phantom as cam 369 and cam 379, but the illustration becomes too confusing as it has been simplified to show and describe one cam. At least two cams with at least two high points are intended. The rise of each cam surface starts out slow and is continuous until it arrives at a predetermined point 380 where there is a sudden rise to the high point 382. With this type of construction, the magnets 360 on the mounting plate 358 will be advanced or retracted gradually over approximately 240° of a circle and then will advance suddenly as a result of the sudden rise in the respective cam surfaces between points 380 and 382. It should be clear that the location and extent of the rapid travel part of the cam can be at any point in the cycle as can the fine tuned part of the cam, i.e. that part where the respective rises of the cam surfaces is gradual and uniform. It should also be clear that the design of the respective cam surfaces can vary so that, for instance, the magnets will be advanced uniformly over a portion of the cycle, then have a sudden advance, and finally have a more rapid advancement than initially, all within the scope of the present invention. The concentric cam shown in phantom as cams 369 and 379 will provide the at least two high point contacts consistent with the invention as disclosed in FIGS. 2-10.

In operation, the grip 62 on the actuator will contain a pointer at one end or at each end on the exposed face pointing toward a series of graduations 84 which are formed around the edge of the aperture 66 in the cover 13 of the side frame 12. The pointer on the grip of the actuator can point to zero, which will indicate that the magnets are spaced a sufficient distance from the spool to be ineffective in providing any magnetic drag to the spool. As the actuator is rotated, the magnets will be advanced toward the spool, adding magnetic drag to the spool with the extent of the magnetic drag being indicated by the pointer indicating a graduation on the scale. With the pointer in the maximum position, the magnets will be positioned with a relatively small air gap between the face of the magnets and the inner face of the spool so as to provide a maximum resistance to the rotation of the spool. With the cam surfaces having at least two high points spaced at least 180° apart, the mounting plate containing the magnets will be advanced or retracted always in a plane transverse to the axis of the shaft. The at least two point support in constant contact between the relative cam surfaces, with the spring urging the full cam surfaces in contact with each other at all times, will make it possible to advance or retract the magnets in a plane, which plane will be transverse to the axis of the shaft and which plane will be parallel to the inner face of the spool so that the drag will be uniform all the way around the periphery of the spool so that the drag force will be uniform and not tend to cant or bind the spool in its rotation relative to the side frames.

I claim:

1. In a fishing reel having a housing with a pair of side frames held apart by a plurality of connecting rods;
    a cover plate affixed outwardly of each side frame;
    a spool shaft carrying a spool between the side frames and being rotatably supported in the side frames, the spool shaft having an axis lying transverse to the planes of the side frames;
    drive means for the spool and spool shaft for rotating the spool and spool shaft about the axis of the shaft;
    clutch means for releasing the spool and the spool shaft form the drive means;
    the improvement characterized by
    brake means for resisting the rotation of the spool, the brake means comprising
    an actuator mounted in an aperture in the cover plate on one side frame and being rotatable about the axis of the shaft;
    first cam structure carried by the actuator, having at least two cam surfaces each extending through an arc in excess of 180° and facing in a direction parallel to the axis of the shaft,
    a mounting plate lying in a plane transverse to the axis of the shaft for supporting a plurality of magnets in a circle about the axis of the shaft;
    means attaching the mounting plate to the reel for non-rotatable axial shifting relative to the axis of the shaft;
    second cam structure carried by the mounting plate, having at least two cam surfaces facing in a direction parallel to the axis of the shaft and extending through an arc in excess of 180° and being in face to face contact with the first cam surface, and
    the first cam structure and the second cam structure each have at least two high points, the at least two high points of each cam structure being spaced apart circumferentially by up to 180°/, whereby rotating the actuator traverses the first cam structure relative to the second cam structure for moving the mounting plate and magnets in a plane parallel to an end face of the spool toward and away from the spool for increasing and decreasing rotational resistance to the spool.

2. In a fishing reel as claimed in claim 1 wherein each of the first and second cam structures have three equally spaced apart high points for three point control of movement of the magnets.

3. In a fishing reel as claimed in claim 1 wherein each cam has a pair of spiral cam surfaces with each surface having a high point spaced 180° from the high point of the other cam surface.

4. In a fishing reel as claimed in claim 3 wherein the rate of rise of each cam surface is uniform, producing a uniform advancing or retracting of the magnets.

5. In a fishing reel as claimed in claim 1 wherein resilient means are provided for urging the second cam structure into continuous contact with the first cam structure.

6. In a fishing reel as claimed in claim 5 wherein said resilient means is a spring positioned between the side frame and the second cam for urging the second cam structure on the mounting plate into contact with the first cam structure on the actuator.

7. In a fishing reel as claimed in claim 1 wherein a bracket is provided between the mounting plate and the second cam structure for supporting the second cam structure.

8. In a fishing reel as claimed in claim 1 wherein the rate of rise of each cam surface is uniform throughout a portion of the circumferential extent of the cam surfaces and has a steep rate of rise over another portion of the circumferential extent of the cam surfaces producing first a steady, gradual advancement and then a rapid advancement of the magnets toward the spool 9. A fishing reel having first and second side frames held apart by a plurality of connecting rods;
    a cover plate affixed outwardly of each side frame;
    a spool shaft rotatably supported in the side frames, the spool shaft having an axis lying transverse to the planes of the side frames;
    a spool mounted on the spool shaft;
    drive means for the spool shaft for rotating the spool about the axis of the shaft; and
    means for resisting the rotation of the spool, the means comprising an actuator carried by the cover on one side frame and being rotatable about the axis of the shaft;
    first cam means carried by the actuator and having first and second arcuate cam surfaces facing in a direction parallel to the axis of the shaft and residing radially one inside the other;
    a mounting means having a portion lying in a plane transverse to the axis of the shaft;
    means attaching the mounting means to the real for non-rotatable axial shifting relative to the axis of the shaft;
    a plurality of magnets carried by the transverse portion of the mounting means in planar spaced relation with respect to a side of the spool; and
    second cam means carried by the mounting means and facing in a direction opposite to the direction in which the magnets are facing, the second cam means having third and fourth arcuate cam surfaces residing radially one inside the other, facing in a direction parallel to the axis of the shaft, and being in face to face contact with the first and second cam surfaces on the first cam means, wherein the first cam surface is radially within the second cam surface and defined at least partially by a first cylindrical wall and the fourth cam surface is radially outside the third cam surface and defined at least partially by a second cylindrical wall so that with the surfaces on the first and second cam means in operative face-to-face relationship the first and second cylindrical walls reside closely, guidingly against each other to consistently maintain the face-to-face relationship of the cam surfaces on the cam means as the actuator is rotated, whereby the mounting means and magnets are moved axially by rotating the first cam means relative to the non-rotatable second cam means and the radially spaced relationship of the cam surfaces assures that the cam surfaces on the first cam means and second cam means are consistently presented to each other to smoothly guide rotation of the first cam means relative to the second cam means.

10. A fishing reel as claimed in claim 9 wherein each of the first and second cam means have three equally spaced part high points for three point control of movement of the magnets.

11. A fishing reel as claimed in claim 9 wherein each cam means has a spiral surface with two high points spaced 180° apart.

12. A fishing reel as claimed in claim 11 wherein the rate of rise of each cam surface is uniform, producing a uniform advancing or retracting of the magnets.

13. A fishing reel as claimed in claim 9 wherein resilient means are provided for urging the second cam means into continuous contact with the first cam means.

14. A fishing reel as claimed in claim 9 wherein indicia means are mounted on the cover plate about the actuator, whereby the extent of resistance is visually determined by the reading of the indicia indicated by a pointer on the actuator.

15. A fishing reel having first and second side frames held apart by a plurality of connecting rods;
a cover plate affixed outwardly of each side frame;
a spool shaft rotatably supported in the side frames, the spool shaft having an axis lying transverse to the planes of the side frames;
a spool mounted on the spool shaft;
drive means for the spool shaft for rotating the spool about the axis of the shaft; and
means for resisting the rotation of the spool, the means comprising an actuator carried by the cover on one side frame and being rotatable about the axis of the shaft;
cam means carried by the actuator and having first and second arcuate cam surfaces facing in a direction parallel to the axis of the shaft and residing radially one inside the other;
a mounting means having a portion lying in a plane transverse to the axis of the shaft;
means attaching the mounting means to the reel for non-rotatable axial shifting relative to the axis of the shaft;
a plurality of magnets carried by the transverse portion of the mounting means in planar spaced relation with respect to a side of the spool;
second cam means carried by the mounting means and facing in a direction opposite to the direction in which the magnets are facing, the second cam means having third and fourth arcuate cam surfaces residing radially one inside the other, facing in a direction parallel to the axis of the shaft, and being in face to face contact with the first and second cam surfaces on the first cam means; and
a high point on each of the first and second cam surfaces being spaced circumferentially 180° from each other, and a high point on each of the third and fourth cam surfaces being spaced circumferentially 180° from each other, whereby the mounting means and magnets are supported by at least two spaced points on the respective cam surfaces and are moved axially by rotating the first cam means relative to the non-rotatable second cam means, each cam means having a spiral surface with two high points spaced 180° apart and the rate of rise of each cam surface varies, producing a varied advancing or retracting of the magnets.

16. In a fishing reel having a housing with a pair of side frames held apart by a plurality of connecting rods;
a cover plate affixed outwardly of each side frame;
a spool shaft carrying a spool between the side frames and being rotatably supported in the side frames, the spool shaft having an axis lying transverse to the planes of the side frames;
drive means for the spool and spool shaft for rotating the spool and spool shaft about the axis of the shaft;
clutch means for releasing the spool and the spool shaft from the drive means;
the improvement characterized by
brake means for resisting the rotation of the spool, the brake means comprising
an actuator mounted in an aperture in the cover plate on one side frame and being rotatable about the axis of the shaft;
a first cam carried by the actuator, having at least two spiral cam surfaces facing in a direction parallel to the axis of the shaft with each cam surface having a high point spaced 180° from the high point of the other cam surface and a variable rate of rise.
a mounting plate lying in a plane transverse to the axis of the shaft for supporting a plurality of magnets in a circle about the axis of the shaft, the mounting plate being axially movable and non-rotatable relative to the axis of the shaft;
means attaching the mounting plate to the reel for non-rotatable axial shifting relative to the axis of the shaft;
a second cam carried by the mounting plate and having at least two spiral cam surfaces facing in a direction parallel to the axis of the shaft, with each mounting plate cam surface having a high point spaced 180° from the high point of the other mounting plate cam surface and a variable rate of rise, the second cam being in face to face contact with the first cam surface, and
the first cam and the second cam each have at least two high points, the at least two high points of each cam being spaced apart circumferentially by up to 180°, whereby rotating the actuator traverses the first cam relative to the second cam for moving the mounting plate and magnets in a plane parallel to an end face of the spool toward and away from the spool for increasing and decreasing rotational resistance to the spool to produce a varied rate of advancement or retraction of the magnets.

* * * * *